(12) United States Patent
Lee et al.

(10) Patent No.: US 7,956,950 B2
(45) Date of Patent: Jun. 7, 2011

(54) LIQUID CRYSTAL DISPLAYS AND METHODS OF FABRICATING THE SAME

(75) Inventors: Eun-guk Lee, Yongin-si (KR); Je-hun Lee, Seoul (KR); Do-hyun Kim, Seoul (KR); Chang-oh Jeong, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 657 days.

(21) Appl. No.: 11/938,023

(22) Filed: Nov. 9, 2007

(65) Prior Publication Data

US 2008/0123039 A1    May 29, 2008

(30) Foreign Application Priority Data

Nov. 24, 2006  (KR) .................. 10-2006-0117209

(51) Int. Cl.
*G02F 1/1339* (2006.01)
(52) U.S. Cl. ......................................... 349/46; 349/138
(58) Field of Classification Search .................. 349/46, 349/138
See application file for complete search history.

(56) References Cited

U.S. PATENT DOCUMENTS

| | | | | |
|---|---|---|---|---|
| 5,166,816 A | * | 11/1992 | Kaneko et al. | 257/59 |
| 5,243,202 A | * | 9/1993 | Mori et al. | 257/59 |
| 5,282,925 A | * | 2/1994 | Jeng et al. | 216/59 |
| 6,449,024 B1 | * | 9/2002 | Hirakata et al. | 349/86 |
| 2006/0141686 A1 | | 6/2006 | Liu et al. | |

FOREIGN PATENT DOCUMENTS

| | | |
|---|---|---|
| JP | 2005-166757 | 6/2005 |
| KR | 10-0271040 | 1/2000 |
| KR | 2002-0029841 | 4/2002 |

OTHER PUBLICATIONS

English Language Abstract for Korean Publication No. 100271040, published Aug. 9, 2000, from the Korean Intellectual Property Office, 1 page.
English Language Abstract for Korean Publication No. 1020020029841, published Apr. 20, 2002, from the Korean Intellectual Property Office, 1 page.
English Language Abstract for Japanese Publication No. 2005-166757, published Jun. 23, 2005, from Patent Abstracts of Japan, 1 page.

* cited by examiner

*Primary Examiner* — David Nelms
*Assistant Examiner* — Phu Vu
(74) *Attorney, Agent, or Firm* — Innovation Counsel LLP

(57) ABSTRACT

In a liquid crystal display, an adhesion layer is provided between an insulating substrate and a wiring feature having very low resistance (e.g. a copper gate line). The adhesion layer may have a thickness of 190 to 210 nm. Good adhesion and high light transmittance can be obtained.

22 Claims, 10 Drawing Sheets

LIQUID CRYSTAL DISPLAYS AND METHODS OF FABRICATING THE SAME

CROSS REFERENCE TO RELATED APPLICATIONS

This application claims priority from Korean Patent Application No. 10-2006-0117209 filed on Nov. 24, 2006 in the Korean Intellectual Property Office, the disclosure of which is incorporated herein by reference in its entirety.

BACKGROUND OF THE INVENTION

1. Field of the Invention

The present invention relates to liquid crystal displays and methods of their fabrication. Some embodiments aim at improving adhesion between a low resistance metal wiring feature and an insulating substrate while providing high transmittance of light traveling through one or more layers of the liquid crystal display.

2. Description of the Related Art

Currently, liquid crystal displays are among the most extensively used types of flat panel displays. A liquid crystal display includes one or two substrates with field generating electrodes, and a liquid crystal layer between the electrodes. Voltages are applied to the electrodes to rearrange the molecules of the liquid crystal layer, thereby controlling the amount of light transmitted through the liquid crystal.

There is a growing demand for increasing the size and resolution of the liquid crystal display.

In many liquid crystal displays, the field generating electrodes are provided in two substrates. One of the substrates (the thin film transistor substrate) includes a plurality of pixel electrodes arranged in a matrix. The other substrate (the common electrode substrate) includes a single common electrode spread over much of the substrate's surface. Voltages are applied to the pixel electrodes to form an image. The thin film transistor substrate includes thin film transistors (TFT), which are three-terminal elements, and which are connected to the pixel electrodes to control connections between the pixel electrodes and a source of power. The liquid crystal display also includes a plurality of wiring features such as gate lines and data lines. The gate lines transmit signals for controlling the thin film transistors. The data lines transmit the voltages to be applied to the pixel electrodes when the transistors are on. Currently, wiring features of low specific resistance are needed for large liquid crystal displays. However, if the gate lines are formed using a material having very low specific resistance such as copper (Cu), copper may diffuse into the silicon active areas of the thin film transistors, and as a result the gate line resistance may increase or the adhesion between the gate line and the insulating substrate may be compromised.

To counter this problem, it has been proposed to include other layers into wiring features in addition to a metal layer of very low resistivity. However, such structures are vulnerable to metal migration due to the galvanic effect between the copper and the other layers. Also, the manufacturing productivity is reduced.

Accordingly, there is still a need for high-productivity manufacturing processes to fabrication liquid crystal displays with wiring features made using low resistivity materials such as copper and with good adhesion between the wiring features and the insulating substrate.

SUMMARY

This section summarizes some features of some embodiments of the invention. The invention is not limited to these features or embodiments except as defined by the appended claims. The claims are incorporated into this section by reference.

In some liquid crystal displays of the present invention, an adhesion layer is provided between an insulating substrate and a wiring feature having very low resistance (e.g. a copper gate line), and the adhesion layer is chosen to provide good adhesion between the wiring feature and the insulating substrate and also to provide good light transmittance.

For example, some embodiments include a liquid crystal display comprising: an insulating substrate; a first wiring feature formed on the insulating substrate and comprising copper; and an adhesion layer interposed between the insulating substrate and the first wiring feature to improve adhesion of the first wiring feature to the insulating substrate, the adhesion layer having a thickness of 190 to 210 nm.

Some embodiments include a method of fabricating a liquid crystal display, the method comprising: forming an adhesion layer having a thickness of 190 to 210 nm on an insulating substrate; and forming a first wiring feature comprising copper on the adhesion layer.

Some embodiments include a method of fabricating a liquid crystal display, the method comprising: performing surface treatment of an insulating substrate using hydrogen fluoride gas; and forming a first wiring feature comprising copper over the insulating substrate's surface treated with the hydrogen fluoride gas.

Some embodiments include a liquid crystal display comprising: (1) a thin film transistor panel comprising: an insulating substrate; an adhesion layer on the insulating substrate; and a first wiring feature formed on the first layer; (2) a light source for emitting light to be incident on the adhesion layer at a predefined angle; wherein a phase difference between rays of light incident on the adhesion layer at said predefined angle is an integer multiple of a value in a range of 3.04 to 3.24 radians for a predetermined light wavelength in a visible spectrum (380 nm to 740 nm).

BRIEF DESCRIPTION OF THE DRAWINGS

The above and other features and advantages of the present invention will become more apparent by description preferred embodiments thereof with reference to the attached drawings of which.

DESCRIPTION OF EXEMPLARY EMBODIMENTS

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

It will be understood that when an element or layer is referred to as being "on" another element or layer, it can be directly on to the other element or layer or intervening elements or layers may be present. In contrast, when an element is referred to as being "directly on" another element or layer, there are no intervening elements or layers present. Like reference numerals refer to like elements throughout the specification.

Spatially relative terms, such as "below", "beneath", "lower", "above", "upper" and the like, may be used herein for ease of description to describe relationships between different elements or features as illustrated in the figures. It will be understood that the spatially relative terms are intended to encompass different orientations of structures in use or operation in addition to the orientation depicted in the figures. Like reference numerals refer to like elements throughout the specification.

A liquid crystal display is provided with a liquid crystal panel that includes a thin film transistor substrate, a common electrode substrate facing the thin film transistor substrate, a liquid crystal layer between the two substrates, and a back light assembly that includes a lamp emitting light to the liquid crystal panel and a diffusion plate. The thin film transistor substrate includes a plurality of wiring lines such as a gate wiring line and a data wiring line. In the case of a COA (Color filter On Array) structure, a color filter pattern may be provided in the thin film transistor substrate.

Figure 1A:
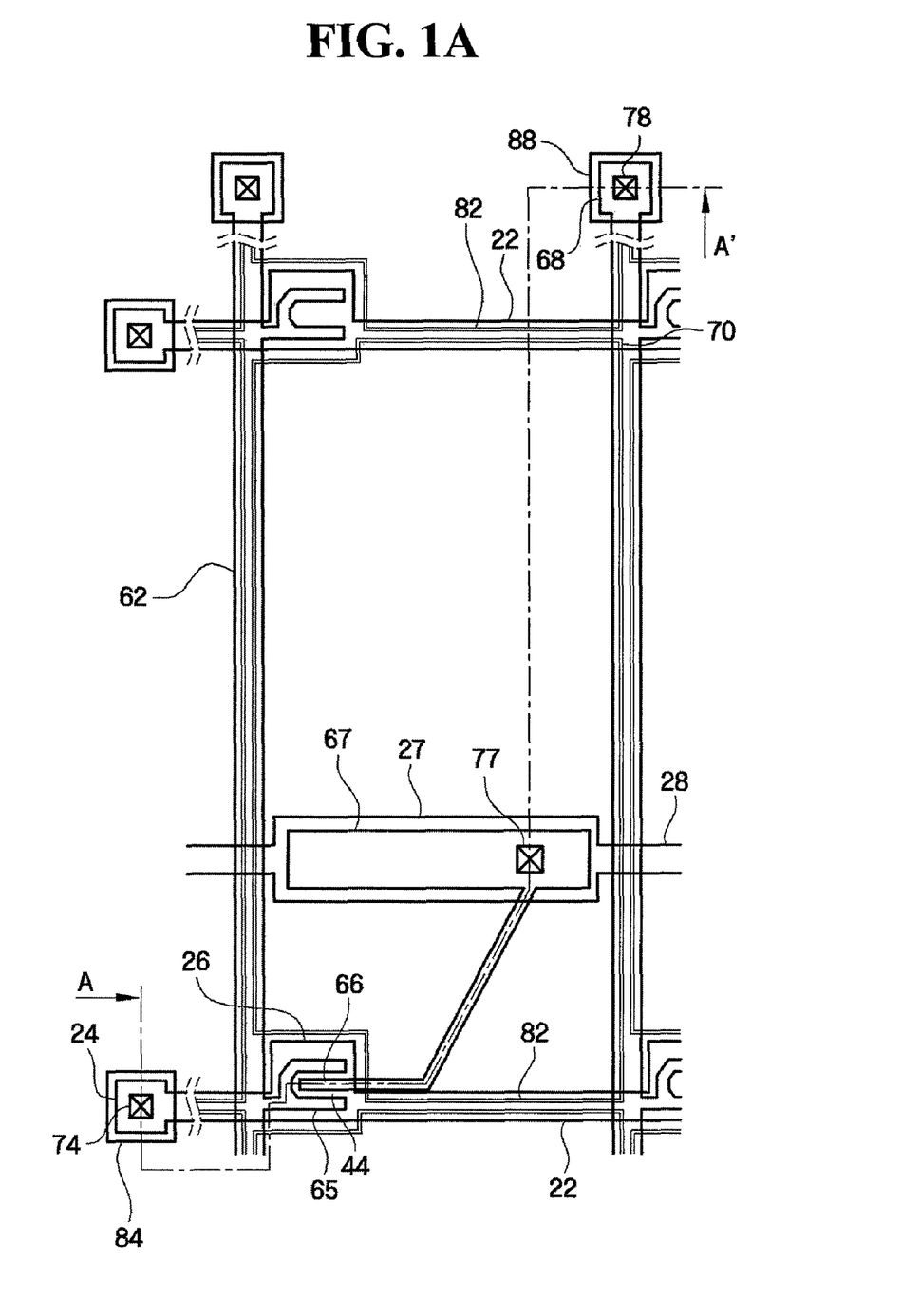
FIG. 1A is a layout view illustrating a thin film transistor substrate in a liquid crystal display according to a first embodiment of the present invention.
Figure 1B:
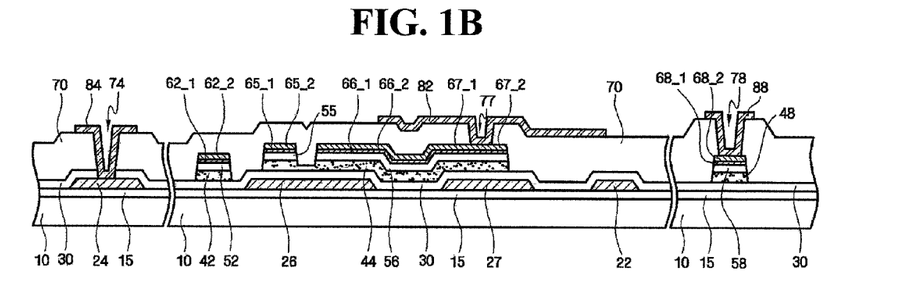
FIG. 1B shows a vertical cross section of the thin film transistor substrate of FIG. 1A along the line A-A' of FIG. 1A.

Now a detailed description will be given of a liquid crystal display according to a first embodiment of the present invention with reference to FIGS. 1A and 1B. FIG. 1A is a layout view (top view) illustrating a thin film transistor substrate of the liquid crystal display according to the first embodiment. FIG. 1B shows a vertical cross section of the thin film transistor substrate along the line A-A' of FIG. 1A.

The thin film transistor substrate of FIGS. 1A, 1B includes an adhesion layer 15 formed on an insulating substrate 10, and also includes first wiring features 22, 24, 26, 27, 28. The thin film transistor substrate further includes second wiring features 62, 65, 66, 67, and 68. Each feature 62 is a stack of features 62_1, 62_2, each feature 65 is a stack of features 65_1, 65_2, each feature 66 is a stack of features 66_1, 66_2, each feature 67 is a stack of features 67_1, 67_2, and each feature 68 is a stack of features 68_1, 68_2. The thin film transistor substrate also includes a passivation layer 70. The first wiring features 22, 24, 26, 27, 28, the second wiring features 62, 66, 67, 68 and the passivation layer 70 are formed over the adhesion layer 15.

The insulating substrate 10 may be formed of a material having high heat resistance and high light transmittance, for example of transparent glass or plastics. Suitable materials for the insulating substrate 10 include a soda lime glass made of a mixture of silicon oxide, calcium oxide, and sodium oxide.

The adhesion layer 15 is formed on the insulating substrate 10 to improve adhesion of the first wiring features 22, 24, 26, 27, 28 made of copper (Cu) as described below to the insulating substrate 10. The first wiring features 22, 24, 26, 27, 28 are formed on the adhesion layer 15. The thickness of the adhesion layer 15 is chosen to obtain high transmittance of light emitted from the back light assembly (not shown). In some variations the transmittance of light emitted from the back light assembly and passing through the adhesion layer 15 is 98 to 100%. The light transmittance is the ratio of the light intensity passing through the adhesion layer 15 to the intensity of light incident on the bottom of the adhesion layer 15. In some variations, the transmittance of 98 to 100% is obtained with the thickness of the adhesion layer 15 in the range of 190 to 210 nm, and preferably 193.6 to 206.4 nm. A 100% transmittance can be obtained with adhesion layer 15 having the thickness of about 200 nm. The thickness of the adhesion layer 15 affects the phase difference between the light passing through the adhesion layer 15 without reflection and the light reflected a number of times within the adhesion layer 15 before leaving the adhesion layer 15. A detailed description thereof is given below. Adhesion layer 15 of a uniform thickness can be made, for example, of silicon nitride (SixNy) or silicon oxide (SiOx).

The first wiring features 22, 24, 26, 27, 28 include gate lines 22 which transmit gate signals. The gate lines 22 run horizontally in the view of FIG. 1A. A gate signal pad 24 is provided at the end of each gate line 22 to receive a gate signal from outside of the thin film transistor substrate and to provide the gate signal to the gate line 22. The thin film transistors' gate electrodes 26 are formed as protrusions of gate lines 22. The storage electrode lines 28 are parallel to the gate lines 22. Each storage electrode line 28 extends horizontally across a row of pixels, and has widened portions 27 which form storage electrodes. Each storage electrode 27 overlaps a respective drain electrode extension 67 connected to a respective pixel electrode 82 as described below. The storage electrode 27 and the respective drain electrode extension 67 are used to form a storage capacitor used for improved storage of electric charge. Each drain electrode extension 67 is formed of layers 67_1, 67_2 described below. The storage electrodes 27 and the storage electrode lines 28 may have different shapes and positions, and may be omitted if the pixels' charge storage capacitances are sufficiently high.

The first wiring features 22, 24, 26, 27, and 28 can be made of a very low resistivity material, for example, copper. The first wiring features 22, 24, 26, 27, and 28 may have the thickness of 50 to 600 nm, and preferably about 200 nm. The first wiring features 22, 24, 26, 27, 28 could be made of aluminum (Al). The specific resistance (i.e. the resistivity) of aluminum is 2.67 $\mu\Omega$·cm, and the specific resistance of the first wiring features made of aluminum is about 3.1 $\mu\Omega$·cm. However, the specific resistance of copper is 1.67 $\mu\Omega$·cm, and the specific resistance of the first wiring features made of copper is about 2.1 $\mu\Omega$·cm. This is about 30% lower than in the case of aluminum. Thus, it is desirable to use copper for the first wiring features and other thin films in liquid crystal displays having high resolution. However, if the first wiring features 22, 24, 26, 27, and 28 are made of copper, some copper may diffuse into a gate insulating layer 30 provided over the first wiring features 22, 24, 26, 27, 28. Copper diffusion away from the first wiring features increases the first wiring features' resistance. To reduce or eliminate copper diffusion, low temperature chemical vapor deposition (CVD) can be used for overlying layers as described below.

The gate insulating layer 30 is a silicon nitride layer formed over the first wiring features 22, 24, 26, 27, and 28 and the adhesion layer 15.

Active layer features 42, 44, and 48 are formed on the gate insulating layer 30 from a semiconductor layer, e.g. a layer of hydrogenated amorphous silicon or polysilicon. The active layer features 44 include thin film transistor active areas. Ohmic contact liners 52, 55, 56, and 58 are made of heavily doped n+ hydrogenated amorphous silicon and/or a silicide, on the active areas 42, 44, and 48. For example, the active layer features 42, 44, and 48 may be a linear type.

The gate insulating layer 30, the active layer features 42, 44, and 48, and the ohmic contact liners 52, 55, 56, and 58 are formed by low temperature chemical vapor deposition. Therefore, copper diffusion is reduced or eliminated to impede the reaction between the silicon (Si) present in the features 30, 42, 44, 48, 52, 55, 56, 58 and the copper present in first wiring features 22, 24, 26, 27, and 28.

The second wiring features 62, 65, 66, 67, 68 are formed on the ohmic contact liners 52, 55, 56, and 58 to overlap the active layer features 42, 44, and 48. The second wiring features 62, 65, 66, 67, 68 each include a respective upper layer feature 62_2, 65_2, 66_2, 67_2, 68_2 made of a very low resistivity material, for example, copper, and also include a respective lower layer feature 62_1, 65_1, 66_1, 67_1, 68_1 serving as a barrier capable of preventing a reaction between the respective upper feature 62_2, 65_2, 66_2, 67_2, 68_2 and the active layer features 42, 44, and 48. The barrier can be a layer of titanium (Ti) or a titanium alloy. If the second wiring features 62, 65, 66, 67, 68 were made entirely of copper, copper could react with silicon (Si) contained in the underlying ohmic contact liners 52, 55, 56, 58, the active layer features 42, 44, and 48, and the gate insulating layer 30. Accordingly, the lower layer features 62_1, 65_1, 66_1, 67_1, and 68_1 are made of a material having low reactivity to silicon to prevent the copper diffusion.

The second wiring features 62, 65, 66, 67, 68 include data lines 62 that overlap the gate lines 22 and run vertically in the view of FIG. 1A. The data lines 62 and the gate lines 22 define pixels. The second wiring features 65 are source electrodes that branch off from the data lines 62 and extend to overlie the ohmic contact liners 55. The second wiring features 68 are data signal pads located at the ends of the data lines 62 to receive image signals from outside of the thin film transistor substrate. The second wiring features 66 are drain electrodes that are located on the ohmic contact liners 56 across from the source electrodes 65 at opposite sides of channel regions overlying the gate electrodes 26 of the thin film transistors. The second wiring features 67 are drain electrode extensions that extend from the drain electrodes 66 to overlap the widened storage electrodes 27 (which are widened to have a large area).

The source electrodes 65 and the drain electrodes 66 overlap the active layer features 44. The drain electrodes 66 face the source electrodes 65. The gate electrodes 26 stretch underneath between the drain electrodes 66 and the source electrodes 65. The active layer features 44 overlie at least portions of the gate electrodes 26. The ohmic contact liners 55 and 56 are located between the active layer features 44 therebeneath and the source and drain electrodes 65, 66 thereon to reduce the contact resistance.

The drain electrode extensions 67 overlap the storage electrodes 27. A drain electrode extension 67, a storage electrode 27, and the intervening portion of the gate insulating layer 30 form a storage capacitor. If the storage electrodes 27 are omitted, the drain electrode extensions 67 may also be omitted.

The ohmic contact liners 52, 55, 56, and 58 reduce contact resistance between the active layer features 42, 44, and 48 therebeneath and the second wiring features 62, 65, 66, 67, 68 thereon. The ohmic contact liners 52, 55, 56, and 58 have substantially the same shape as the respective second wiring features 62, 65, 66, 67, 68.

The active layer features 42, 44, and 48 have substantially the same shape as the second wiring features 62, 65, 66, 67, 68 and the ohmic contact liners 52, 55, 56, 58, except that the active layer features 44 include the channel regions of the thin film transistors is the channel regions are located between the source electrodes 65 and the drain electrodes 66. The ohmic contact liners 55 are provided under the source electrodes 65 and are separated from the ohmic contact liners 56 provided under the drain electrodes 66. The active layer features 44 extend continuously from under the source electrodes 65 to under the drain electrodes 66 to provide the channel regions.

The passivation layer 70 is formed on the second wiring features 62, 65, 66, 67, 68 and those portions of the active layer features 44 which are not covered with the second wiring features 62, 65, 66, 67, 68. The passivation layer 70 can be made of photosensitive organic materials having red, green, and blue color filters. The color filters pass light of predefined wavelengths in the visible spectrum (the color filters may or may not pass light outside of the visible spectrum). For example, the color filters may include a red organic material which passes red light, a green organic material which passes green light, and a blue organic material through which passes blue light. In other embodiments, the color filters are formed on the common electrode substrate (not shown).

Further, the material for the passivation layer 70 can be chosen as a photosensitive dielectric which has a low dielectric constant and which is easily manufacturable to have a very smooth, planar top surface. Such materials include organic materials, for example, a-Si:C:O ("a-Si" means amorphous silicon). Such materials also include inorganic materials, for example, a-Si:O:F formed by plasma enhanced chemical vapor deposition (PECVD), or silicon nitride (SixNy). A combination of an organic upper layer and an inorganic (e.g. silicon nitride or silicon oxide) lower layer can also be used, the lower layer preventing the organic upper layer from contacting the active layer features 42, 44, and 48 between the source electrodes 65 and the drain electrodes 66.

Contact holes 77 and 78 are formed in the passivation layer 70 to expose the respective drain electrode extensions 67 and data signal pads 68. Contact holes 74 are formed in the passivation layer 70 and the gate insulating layer 30 to expose the respective gate signal pads 24.

A suitable material, e.g. ITO (tin-doped indium oxide) or IZO (indium-zinc oxide), is deposited over the passivation layer 70 and patterned to form pixel electrodes 82 and also to form contact liners 84, 88 in the respective contact holes 74, 78. The contact liners 84, 88 physically contact, respectively, the gate signal pads 24 and the data signal pads 68.

The common electrode substrate is placed over the thin film transistor substrate. The liquid crystal layer is interposed between the two substrates to form the liquid crystal panel (not shown). Located under the liquid crystal panel is the back light assembly (not shown) that includes an optical sheet, a diffusion plate, a lamp, and a bottom sash that receives the optical sheet, the diffusion plate, and the lamp. A top sash (not shown) is disposed on top of the liquid crystal panel to protect the liquid crystal panel. The back light assembly may be a direct type in which a plurality of lamps are provided under the liquid crystal panel to be parallel to each other and to emit light in phase with each other, or an edge type in which the lamps are disposed at one or two sides of the bottom sash.

Now fabrication of a liquid crystal display according to the first embodiment of the present invention will be described in detail with reference to FIGS. 2 to 11, 1A and 1B. FIGS. 2 to 11 show vertical cross sections of the thin film transistor substrate of the first embodiment at different stages of fabrication.

Figure 2:
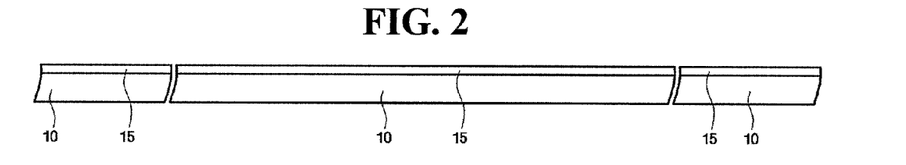
FIGS. 2 to 11 show vertical cross sections of the thin film transistor substrate of the liquid crystal display according to the first embodiment of the present invention at different stages of fabrication.

First, as shown in FIG. 2, the adhesion layer 15 is formed on the insulating substrate 10. Substrate 10 can be made of glass for example. The adhesion layer 15 is formed by depositing an inorganic film, for example, silicon nitride or silicon oxide, using chemical vapor deposition. The thickness of the adhesion layer 15 may be 190 to 210 nm, preferably 193.6 to 206.4 nm, and more preferably about 200 nm to provide the light transmittance of 98 to 100% through the adhesion layer.

Figure 3:
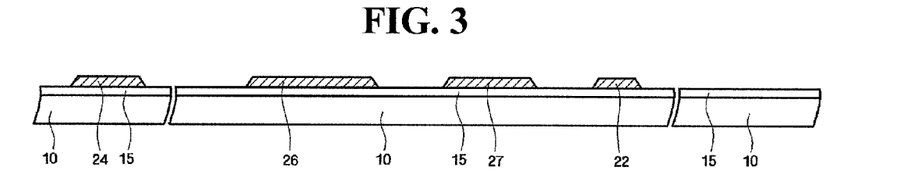

Subsequently, as shown in FIGS. 3 and 1A, the first wiring features 22, 24, 26, 27, and 28 (i.e. the gate lines 22, the gate electrodes 26, the gate signal pads 24, the storage electrodes 27, and the storage electrode lines 28) are formed on the adhesion layer 15 from a conductive layer, e.g. copper. Copper can be deposited by sputtering and then patterned to form the first wiring features 22, 24, 26, 27, and 28. Sputtering temperatures of about 100° C. can be used. The copper can be patterned by a wet etch using a solution which contains, for example, phosphoric acid, nitric acid, and acetic acid as main components. As the first wiring features 22, 24, 26, 27, and 28 are made entirely of copper, without an additional overlying diffusion barrier layer, the etch skew can be reduced when the first wiring features are patterned since the etch skew is easier to control in etching a single copper layer than etching multiple layers. This is further discussed in detail below. Also, since the first wiring features are patterned using phosphoric acid, nitric acid, and acetic acid as the main etching components, the patterning is easier than with an etching solution including hydrogen peroxide and ultra pure water as main components.

Next (FIGS. 4 and 1A), the gate insulating layer 30 (silicon nitride), an active layer 40, and a doped amorphous silicon layer 50 are sequentially deposited over the first wiring features 22, 24, 26, 27, and 28 and the adhesion layer 15, possibly by low temperature chemical vapor deposition, to the thickness of 150 to 500 nm, 50 to 200 nm, and 30 to 60 nm respectively. The chemical vapor deposition temperatures can be as low as 100 to 250° C. for example, so that the silicon contained in the gate insulating layer 30, the active layer 40, and the doped amorphous silicon layer 50 does not react with the copper in the underlying first wiring features 22, 24, 26, 27, and 28. The low temperature does not allow copper diffusion from the first wiring features into the gate insulating layer 30, the active layer 40, and the doped amorphous silicon layer 50 even in the absence of a diffusion barrier. The copper diffusion would increase the specific resistance of the first wiring features 22, 24, 26, 27, and 28 and would hence be undesirable.

In some variations of this fabrication method, the specific resistance of the first wiring features 22, 24, 26, 27, and 28 is 2.0 to 2.3 μΩ·cm, which is a low value. In one example, four samples were prepared as follows. The adhesion layer 15 was deposited to a thickness of 200 nm. The first wiring features 22, 24, 26, 27, and 28 were made from a copper layer of a thickness of 200 nm. The gate insulating layer 30, the active layer 40, and the doped amorphous silicon layer 50 were deposited by chemical vapor deposition at a temperature of 245° C. The specific resistance of copper was measured in the samples, and was found to be 2.05, 2.06, 2.07, and 2.16 μΩ·cm respectively. In another example, the same materials and thickness values were used for the adhesion layer 15 and the first wiring features 22, 24, 26, 27, and 28 as in the previous example, but chemical vapor deposition temperature for the gate insulating layer 30, the active layer 40, and the doped amorphous silicon layer 50 was 370° C. Again, four samples were prepared. The specific resistance of copper was measured in these samples and was found to be 2.55, 2.62, 2.99, and 3.01 μΩ·cm respectively. As seen from the above, lower temperature of the chemical vapor deposition process in depositing the gate insulating layer 30, the active layer 40, and the doped amorphous silicon layer 50 impedes the diffusion of copper from the first wiring features 22, 24, 26, 27, and 28 to provide low specific resistance in the absence of a diffusion barrier layer.

Returning to FIG. 4, conductive layers 60_1 and 60_2 are formed on the doped amorphous silicon layer 50 using a suitable process such as sputtering. Layers 60_1, 60_2 are then patterned to provide the second wiring features. The upper conductive layer 60_2 is made of a very low resistance material, for example, copper, and the lower conductive layer 60_1 is made of a material having low reactivity to silicon and capable of preventing a reaction between the upper conductive layer 60_2 and the active layer features 42, 44, and 48. Suitable materials for layer 60_1 include titanium and its alloys. Layer 60_1 prevents the copper of layer 60_2 from diffusing and reacting with the silicon (Si) contained in the ohmic contact liners 52, 55, 56, and 58 (to be formed from layer 50), in the active layer features 42, 44, and 48, and in the gate insulating layer 30.

Figure 4:
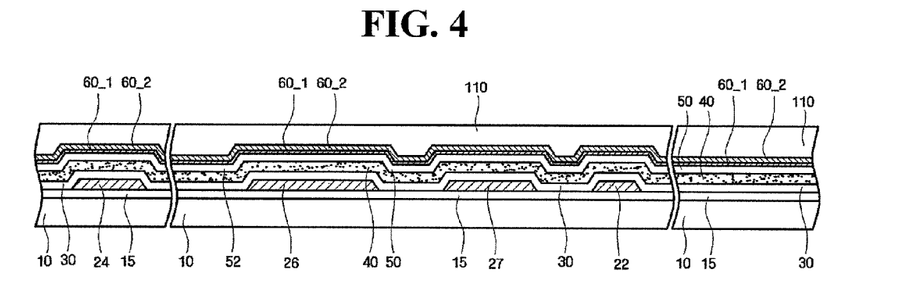
Figure 5:
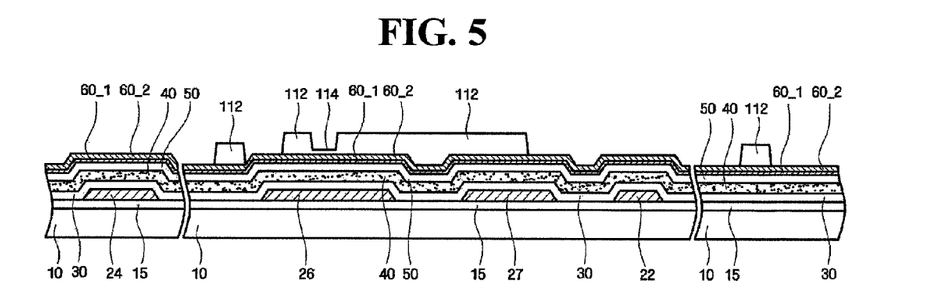

A photoresist layer 110 is formed over the layers 60_1 and 60_2. Referring to FIGS. 4, 5, and 1A, the photoresist layer 110 is exposed to light through a mask, and is then developed to form photoresist features 112 and 114. Features 114 overlie, and define, the channel regions of the thin film transistors, that is, the regions between the source electrodes 65 and the drain electrodes 66. The features 114 are thinner than the features 112 which overlie, and define, the second wiring features. A suitable thickness ratio of the resist features 114 relative to the resist features 112 depends on the etching process to be used as described below. In some variations, the ratio is 1:2, and the thickness of features 114 may be 400 nm or less.

Various types of processes may be used to provide the dual thickness of the photoresist features. The dual thickness can be provided by controlling the intensity of light irradiating the photoresist during photoresist exposure, and the light intensity can be controlled by providing slit or lattice patterns on the mask, or by providing semitransparent mask areas.

Figure 6:
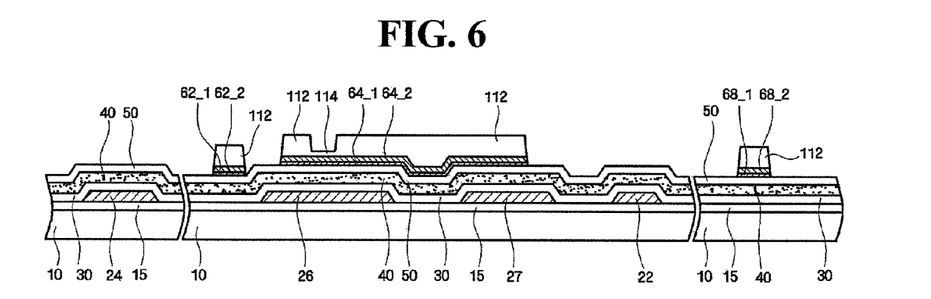

Referring to FIGS. 5 and 6, the exposed portions of the conductive layers 60_1 and 60_2 are subjected to etching.

The upper conductive layer 60_2, if made of copper, may be wet-etched by an etching solution that contains phosphoric acid, nitric acid, and acetic acid as main components. The lower conductive layer 60_1, if made of titanium or a titanium alloy, may be dry-etched by an etching gas. Even though the second wiring features have a double-layer structure, since the upper conductive layer 60_2 and the lower conductive layer 60_1 are subjected to different etching processes, formation of unsatisfactory patterns during the etch may be prevented. Additionally, there is an advantage in using the same etching solution for the layer 60_2 as for the first wiring features 22, 24, 26, 27, and 28.

As illustrated in FIG. 6, the conductive layers 60_1, 60_2 remain only over the channel regions and in the regions of the second wiring features 62, 65, 66, 67, 68. Numerals 64_1, 64_2 denote those portions of respective layers 60_1, 60_2 which provide the second wiring features 65, 66, 67 (FIG. 1B) and overlie the channel regions. The second wiring features have been thus fully defined except that the source electrodes 65 have not been separated from the drain electrodes 66 (see FIG. 1B).

Figure 7:
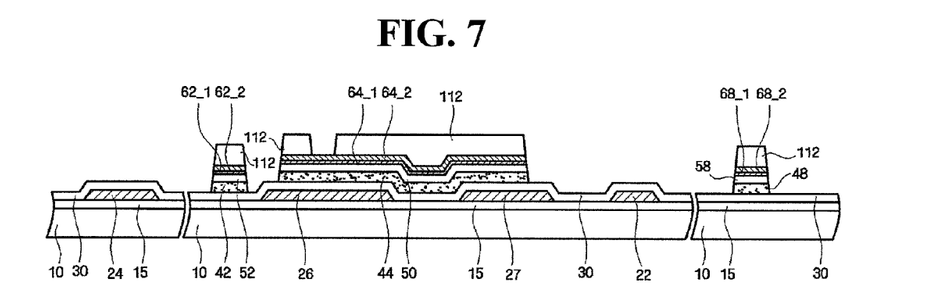

Referring to FIGS. 6 and 7, a dry etch is conducted to remove the exposed portions of doped amorphous silicon layer 50, i.e. the portions not covered by the photoresist overlying the channel regions and the second wiring features. This etch is continued to also remove the underlying portions of the active layer 40. The etch attacks the photoresist features 112 and 114 to remove the features 114, but the etch is highly selective to the gate insulating layer 30. In a preferred embodiment, the etching rate of the photoresist features 112 and 114 is almost equal to the etching rate of the active layer 40. This can be achieved using a mixture of $SF_6$ and HCl or a mixture of $SF_6$ and $O_2$ as the etching gas. If the photoresist and the active layer have equal etching rates, than the features 114 should be no thicker than the total thickness of the active layer 40 and the doped amorphous silicon layer 50.

The dry etch removes the resist features 114 to expose the conductive layer 60_2 (i.e. 64_2) over the channel regions. The etch of the doped amorphous silicon layer 50 and the active layer 40 exposes portions of the gate insulating layer 30. The etch thins down but does not remove the resist features 112.

Then an ashing step is performed to remove any resist 114 that may remain over the channel regions.

Figure 8:
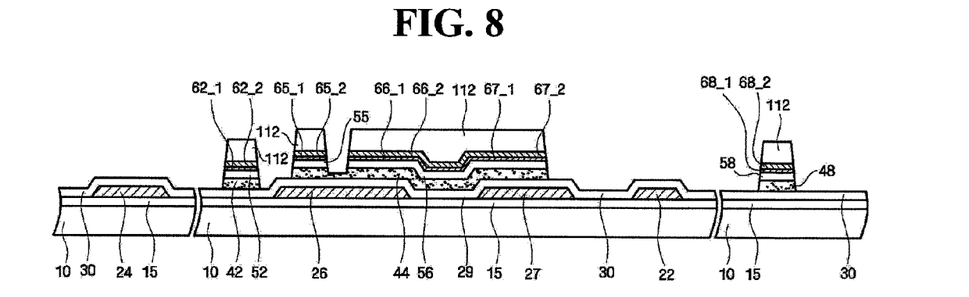

Subsequently, as shown in FIGS. 7 and 8, those portions of the conductive features 64_1 and 64_2 which overlie the channel regions are etched away. This can be done using the same process that was used to pattern the layers 60_1 and 60_2 as described above in connection with FIG. 6. More particularly, the upper conductive layer 64_2 can be made of copper and is subjected to a wet etch, and the lower conductive layer 64_1 can be made of titanium or a titanium alloy and is subjected to a dry etch. Subsequently, an amorphous silicon etch is performed to pattern the amorphous silicon layer 50 into ohmic contact liners 52, 55, 56, and 58. This etch can be a dry etch using an etching gas containing a mixture of $CF_4$ and HCl or a mixture of $CF_4$ and $O_2$. If $CF_4$ and $O_2$ are used, the active layer features 42 and 48, that are made of intrinsic amorphous silicon, may have a uniform thickness. In such a process, a portion of the active layer feature 44 may be removed to reduce the thickness, and the resist features 112 may also be etched to a predetermined thickness. At the same time, the etch should be highly selective to the gate insulating layer 30. Needless to say, it is preferable that the photoresist features 112 be thick enough not to allow exposure of the underlying second wiring features 62, 65, 66, 67, 68 when the photoresist features 112 are etched. The second wiring features 62, 65, 66, 67, 68 include the upper features 62_2, 65_2, 66_2, 67_2, and 68_2 that are made of copper, and the lower features 62_1, 65_1, 66_1, 67_1, and 68_1 that are made of a barrier material (e.g. titanium (Ti) or its alloy) capable of preventing the reaction between the upper features 62_2, 65_2, 66_2, 67_2, and 68_2 and the active layer features 42, 44, and 48.

By the end of this process, the source electrodes 65 and the drain electrodes 66 are separated from each other, thereby finishing the formation of the second wiring features 65, 66 and the underlying ohmic contact liners 55 and 56.

Figure 9:
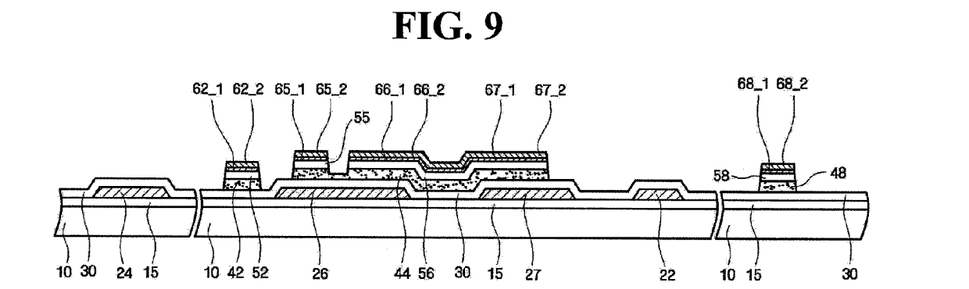

As shown in FIGS. 8 and 9, the remaining photoresist 112 is removed.

Figure 10:
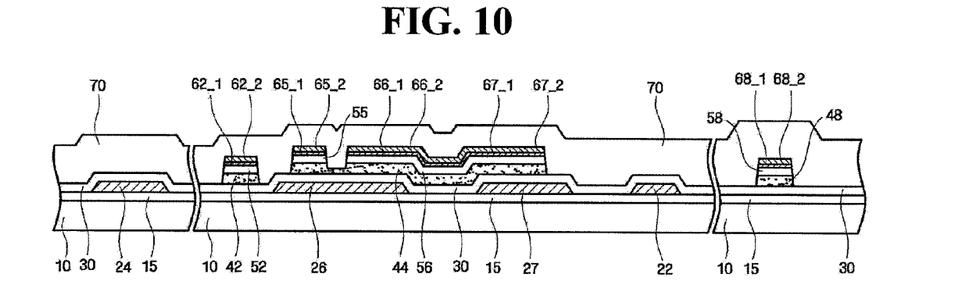

As shown in FIG. 10, the passivation layer 70 is formed on the resulting structure. The passivation layer 70 may be formed by depositing red, green and blue organic materials that act as color filters, then depositing a photosensitive organic material which is easily manufacturable to have a very smooth, planar top surface, or depositing an inorganic material such as silicon nitride. The deposition processes can be chemical vapor deposition.

Figure 11:
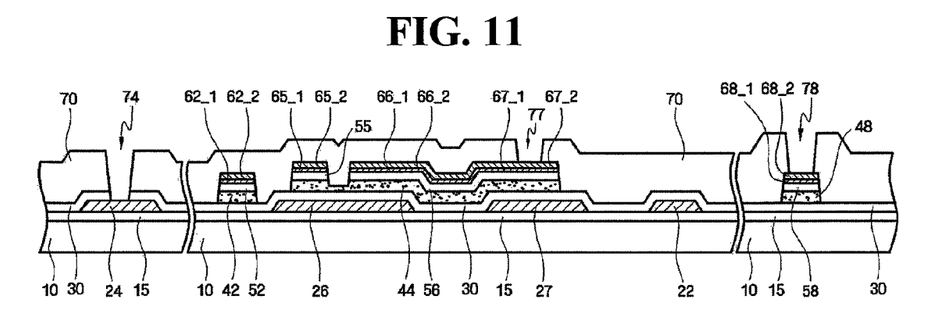

Subsequently, as shown in FIG. 11, the passivation layer 70 is photolithographically patterned together with the gate insulating layer 30 to form the contact holes 74, 77, and 78 exposing the drain electrode extensions 67, the gate signal pads 24, and the data signal pads 68. Depending on the materials of the passivation layer 70 and the gate insulating layer 30 and on the etching processes applied, the gate insulating layer 30 may or may not be etched by the same process as the passivation layer 70.

Finally, as shown in FIGS. 1A and 1B, the ITO or IZO layer is deposited to a thickness in the range of 40 to 50 nm, and then patterned photolithographically to form the pixel electrodes 82 connected to the drain electrode extensions 67 and also to form contact liners 84 connected to the gate signal pads 24, and to form contact liners 88 connected to the data signal pads 68. Fabrication of the thin film transistor substrate is thus completed. Before the ITO deposition, the structure can be pre-heated in nitrogen atmosphere to prevent oxidation of the metal layers 24, 67, 68 exposed in the contact holes 74, 77, and 78.

After the ITO or IZO deposition, the common electrode substrate is disposed to face the thin film transistor substrate, and the liquid crystal is injected between the two substrates to form the liquid crystal panel. The back light assembly that includes the optical sheet, the diffusion plate, the lamp, and the bottom sash is disposed under the liquid crystal panel, and the top sash is combined with the bottom sash to complete the fabrication of the liquid crystal display.

Figure 12:
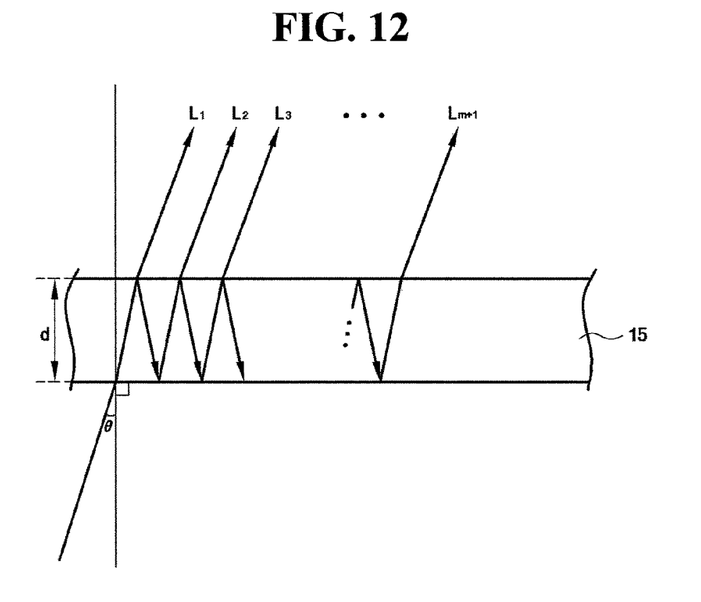
FIG. 12 illustrates calculation of the thickness of an adhesion layer in the thin film transistor substrate of the first embodiment of the present invention.
Figure 13:
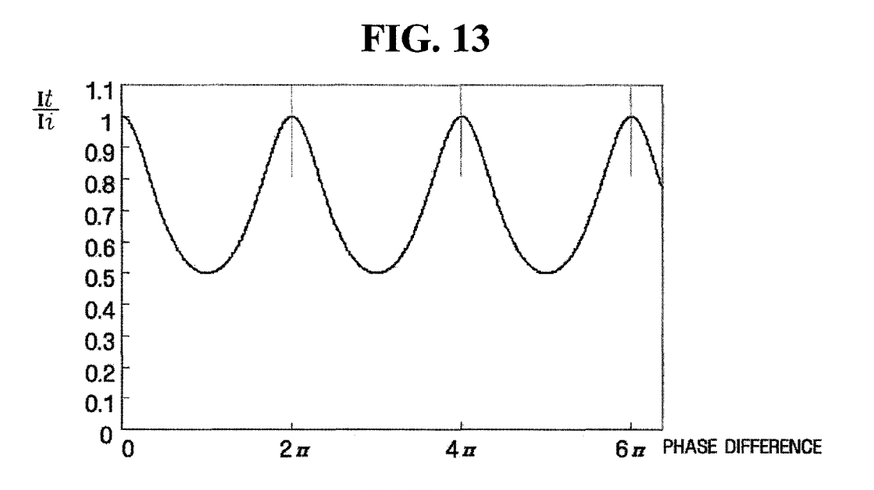
FIG. 13 is a graph illustrating light transmittance of the adhesion layer in the thin film transistor substrate of the first embodiment of the present invention.

Now the formation of the adhesion layer 15 having the above-mentioned thickness will be described with reference to FIGS. 12 and 13. FIG. 12 is a schematic view illustrating the thickness calculation for the adhesion layer of the thin film transistor substrate manufactured according to the first embodiment of the present invention. FIG. 13 is a graph illustrating transmittance of such adhesion layer.

Referring to FIG. 12, the light emitted by the back light assembly travels through the adhesion layer 15 to the eye of the viewer. On its way to the viewer, the light is refracted by the insulating layer 10 and the adhesion layer 15. When the light reaches the upper surface of the adhesion layer 15, some of the light, shown as $L_1$, leaves the adhesion layer 15 right away, and some of the light is reflected at the upper and lower surfaces of the adhesion layer 15 one or more times before exiting the adhesion layer through the upper surface. The light ray $L_2$ leaves the adhesion layer 15 after one reflection at the upper surface, the light $L_3$ ray leaves the adhesion layer 15 after two reflections at the upper surface, and so on. The light ray $L_{m+1}$ leaves the adhesion layer 15 after m reflections at the upper surface. The phase difference (Δ) between light rays $L_i$, $L_{i+1}$ emerging from the adhesion layer 15 is given by the following equation (1):

$$\Delta = (4\pi/\lambda) \cdot n \cdot d \cdot \cos\theta \quad (1)$$

In the equation (1), λ is a wavelength of light that is incident on the adhesion layer 15, n is a refractive index of the material of the adhesion layer 15, d is the thickness of the adhesion layer 15, and θ is the angle between the light incident on the adhesion layer 15 and the normal to the adhesion layer 15.

The phase difference between the light rays $L_i$, $L_j$ leaving the adhesion layer 15 is related to the transmittance of the adhesion layer. The transmittance is the ratio of the intensity ($I_t$) of light emerging from the adhesion layer 15 to the intensity ($I_i$) of light incident on the adhesion layer 15. The transmittance ($I_t/I_i$) is given by the following equation (2):

$$I_t/I_i = 1/(1 + F \cdot \sin^2(\Delta/2)) \quad (2)$$

where F is given by the following equation (3):

$$F = 4r^2/(1-r)^2 \quad (3)$$

In equation (3), r is the reflectance of the adhesion layer. The reflectance is a constant that depends on the medium. Accordingly, F depends on the adhesion layer medium.

As shown in FIG. 13, the transmittance depends on the phase difference between the light rays that pass through the adhesion layer 15 (FIG. 12). As seen from equation (2), if the phase difference Δ is an integer multiple of 2π, the transmittance is 1, that is, 100%. If the phase difference is 1π, 3π, 5π, etc. the transmittance reaches its minimum value of 1/(1+F). If the square $r^2$ of the reflectance r of the adhesion layer is 0.27, it can be seen from equation (3) that F is about 2.0. Accordingly, when the phase difference between the rays emerging from the adhesion layer is 3.04 to 3.24 radians (i.e. about π) or an integer multiple thereof, the transmittance of 98 to 100% is obtained as seen from equation (2).

Equation (1) implies that if the wavelength of the incident light is 600 nm, the refractive index n of the adhesion layer is 1.5, and the incident angle θ is 0°, then the phase difference of 3.04 to 3.24 can be obtained if the thickness (d) is 193.6 to 206.4 nm. Accordingly, if the thickness (d) of the adhesion layer 15 is 190 to 210 nm, and preferably 193.6 to 206.4 nm, the adhesion layer 15 can have high transmittance. If the thickness of the adhesion layer 15 is about 200 nm thick, the transmittance is 100%.

Figure 14:
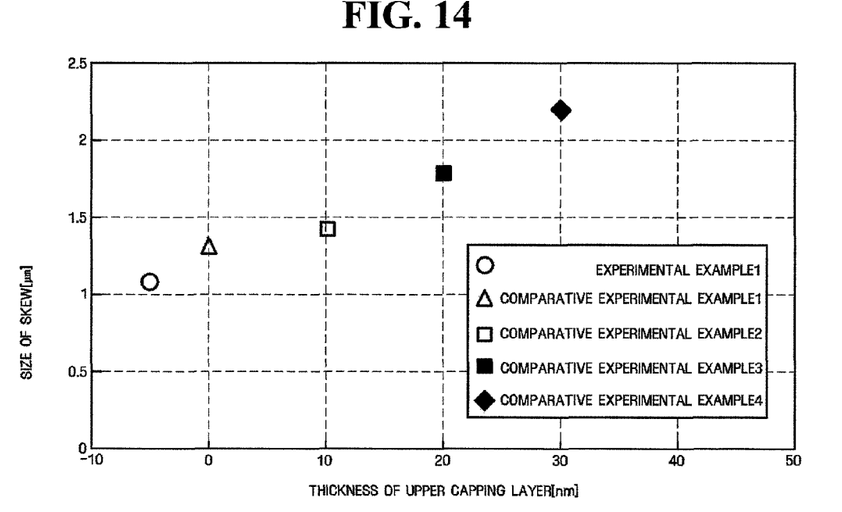
FIG. 14 is a graph illustrating the skew of a first wiring feature formed of a single copper layer in the thin film transistor substrate according to the first embodiment of the present invention, and skews the wiring feature formed of a plurality of layers.

FIG. 14 illustrates the skew actually obtained for the first wiring features 22, 24, 26, 27, and 28 for the case when the first wiring features were formed from a single copper layer according to the first embodiment of the present invention (this case is labeled "EXPERIMENTAL EXAMPLE 1"), and also illustrates the skews obtained when the first wiring features 22, 24, 26, 27, and 28 were formed of a plurality of layers (COMPARATIVE EXPERIMENTAL EXAMPLES 1-4). The values of FIG. 14 were obtained as follows.

Experimental Example 1

The first wiring features 22, 24, 26, 27, 28 were formed from a single copper layer deposited to a thickness of 200 nm, and etched using an etching solution containing phosphoric acid, nitric acid, and acetic acid as main components. The skew was then measured as the maximum deviation of the width of the first wiring features 22, 24, 26, 27, 28 from the drawn pattern on the optical mask.

Comparative Experimental Example 1

The first wiring features were manufactured as in Experimental example 1 except that the copper deposition was preceded by deposition of a lower passivation layer of molybdenum of 30 nm thickness. After the copper deposition, the copper layer and the lower passivation layer were etched using an etching solution containing hydrogen peroxide and ultra pure water as main components to form the first wiring features.

Comparative Experimental Examples 2 to 4

The first wiring features were manufactured as in Comparative experimental example 1 except that the etch was preceded by deposition of an upper capping layer made of molybdenum to a thickness of 10 nm, 20 nm, and 30 nm respectively. The upper capping layer, the copper layer, and the lower passivation layer were then etched to form the first wiring features.

As shown in FIG. 14, the skew increased with the thickness of the upper capping layer. In Comparative experimental examples 2 to 4, the skew was 1.4 μm, 1.8 μm, and 2.2 μm respectively, increasing with the thickness of the upper capping layer. In Comparative experimental example 1 (with a lower passivation layer but without an upper capping layer), the skew was 1.3 μm. In contrast, in Experimental example 1 in which the first wiring features 22, 24, 26, 27, and 28 were formed of the single copper layer, the skew was 1.1 μm. It was thus confirmed that the skew was the smallest when the first wiring features 22, 24, 26, 27, and 28 were formed using the single copper layer. Also, if the first wiring features 22, 24, 26, 27, and 28 are formed from a single copper layer, it is possible to use an etching solution containing phosphoric acid, nitric acid, and acetic acid as main components, which is beneficial for creating a desirable micropattern in forming the first wiring features.

Figure 15:
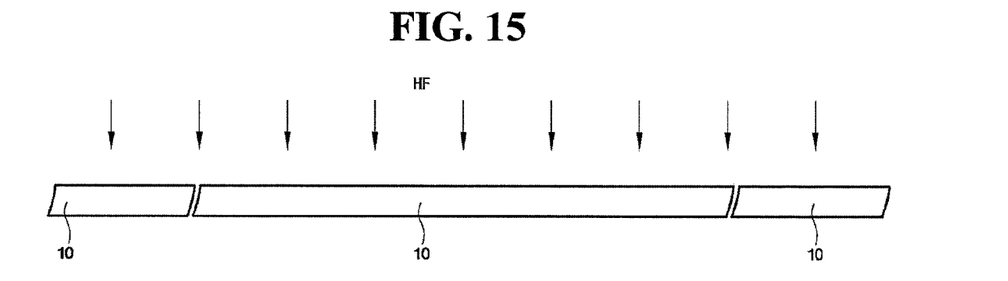
FIGS. 15 and 16 show vertical cross sections of a thin film transistor substrate in a liquid crystal display according to a second embodiment of the present invention at different stages of fabrication.

Now fabrication of the liquid crystal display according to the second embodiment of the present invention will be described with reference to the cross sectional views of FIGS. 15 and 16.

Like in the first embodiment, the fabrication starts with providing an insulating substrate 10 (FIG. 15) that can be soda lime glass for example. The insulating substrate 10 is subjected to surface treatment in order to improve the adhesion between the first wiring features (shown at 22, 24, 26, 27, and 28 in FIG. 16) and the insulating substrate 10. The surface treatment is performed using a substance capable of etching the insulating substrate 10. The substance can be hydrogen fluoride (HF) gas for example.

Figure 16:
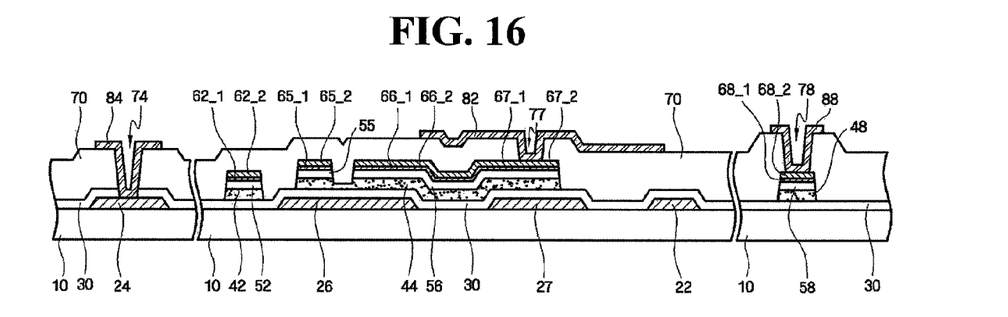

Fabrication then proceeds substantially as in FIGS. 3 to 11 to manufacture the thin film transistor substrate shown in FIG. 16.

Next, the common electrode substrate is disposed over the thin film transistor substrate, and liquid crystal is injected between the two substrates to form the liquid crystal panel. The back light assembly is disposed under the liquid crystal panel to complete the fabrication of the liquid crystal display.

Figure 17A:
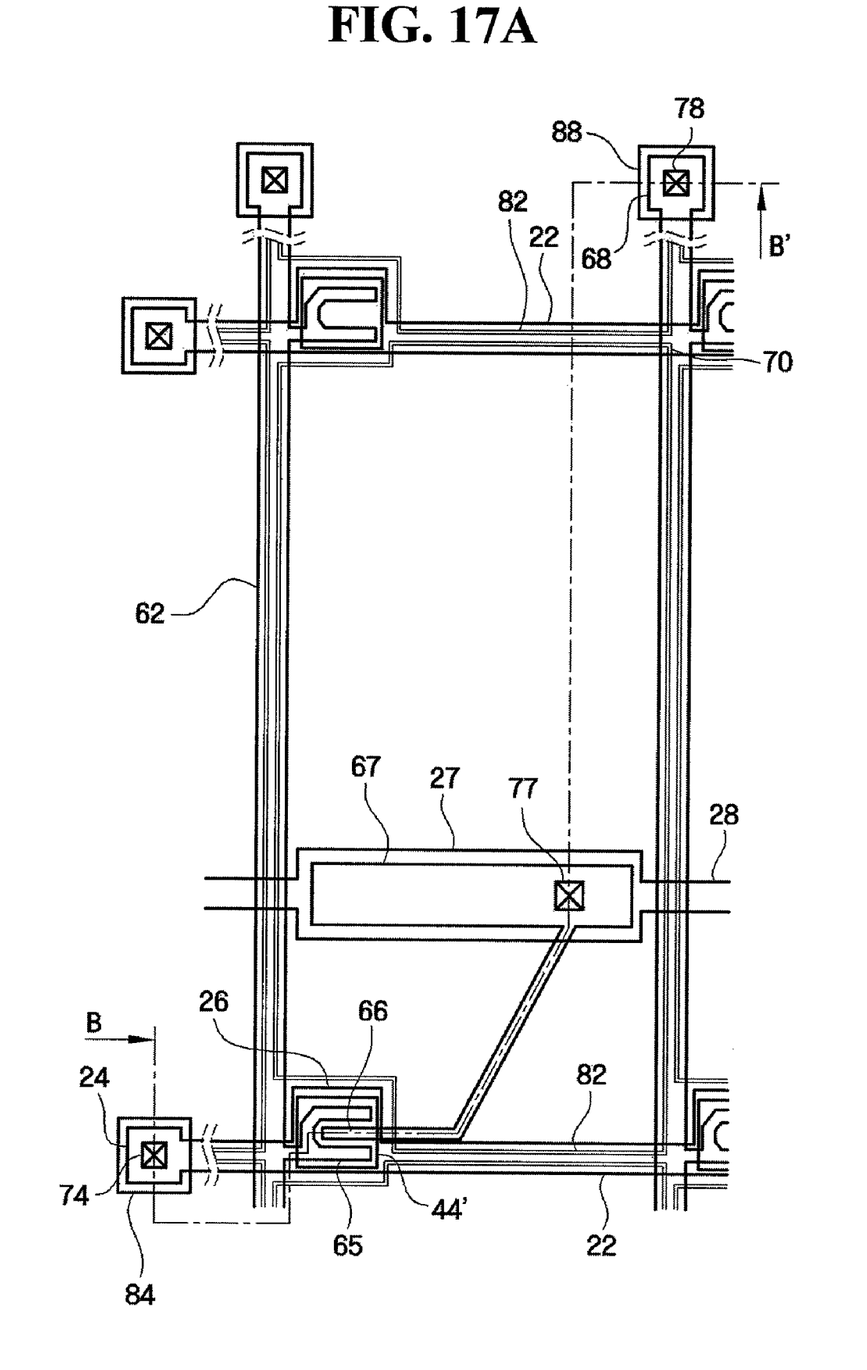
FIG. 17A is a layout view illustrating the thin film transistor substrate according to the second embodiment.
Figure 17B:
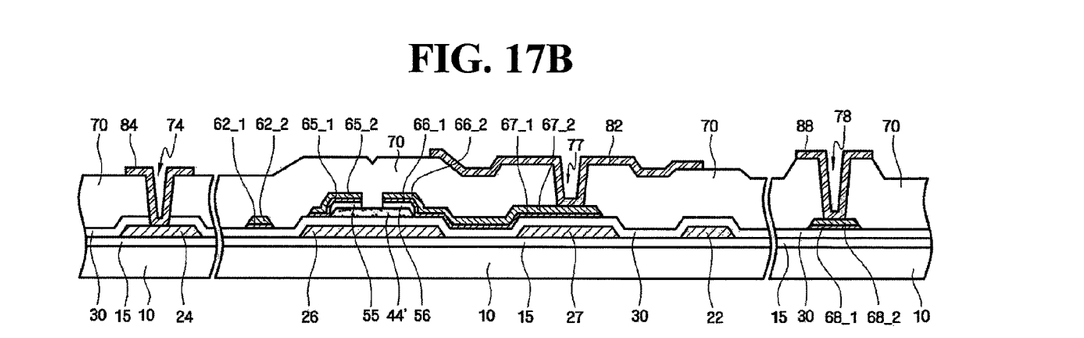
FIG. 17B shows a vertical cross section of the thin film transistor substrate along the line B-B' of FIG. 17A.

Now the structure of the thin film transistor substrate according to the second embodiment of the present invention will be described with reference to FIGS. 17A and 17B. FIG. 17A is a layout view illustrating the thin film transistor substrate according to the second embodiment. FIG. 17B shows a vertical cross section taken along the line B-B' of FIG. 17A. The elements having the same function as in the first embodiment (FIGS. 1A and 1B) are referenced by the same reference numerals, and the description thereof will be brief or omitted.

Like in the first embodiment, the adhesion layer 15 is formed on the insulating substrate 10, and the first wiring features 22, 24, 26, 27, and 28 are formed from copper on the adhesion layer 15. The gate insulating layer 30 is formed of silicon nitride over the insulating substrate 10 and the first wiring features 22, 24, 26, 27, and 28.

Active layer features 44' are semiconductor islands made of semiconductor materials such as hydrogenated amorphous silicon or polysilicon over the gate insulating layer 30 above the gate electrodes 26. Ohmic contact liners 55 and 56 are made of a silicide or heavily doped n+hydrogenated amorphous silicon over the active layer features 44'. Like in the first embodiment, the gate insulating layer 30, the active layer features 44', and the ohmic contact liners 55 and 56 are formed by low temperature chemical vapor deposition to prevent copper diffusion from the first wiring features 22, 24, 26, 27, and 28.

The second wiring features 62 (a stack of features 62_1, 62_2), 65 (a stack of features 65_1, 65_2), 66 (a stack of features 66_1, 66_2), 67 (a stack of features 67_1, 67_2), 68 (a stack of features 68_1, and 68_2) are formed over the ohmic contact liners 55 and 56 and the gate insulating layer 30.

The passivation layer 70 is formed on the second wiring features 62, 65, 66, 67, 68 and on those portions of the active layer features 44' which are not covered with the second wiring features 62, 65, 66, 67, 68. The contact holes 77 and 78 are formed in the passivation layer 70 to expose the respective drain electrode extensions 67 and the respective data signal pads 68. The contact holes 74 are formed in the passivation layer 70 and the gate insulating layer 30 to expose the respective gate signal pads 24. The pixel electrodes 82 are formed on the passivation layer 70 to be electrically connected to the respective drain electrodes 66 through the respective contact holes 77.

Contact liners 84 and 88 are formed on the passivation layer 70. Contact liners 84 are connected to the respective gate signal pads 24 through the respective contact holes 74. Contact liners 88 are connected to the respective data signal pads 68 through the respective contact holes 78. The pixel electrodes 82 and the contact liners 84 and 88 may be formed, for example, from ITO or IZO.

Like in the first embodiment, the back light assembly is disposed under the liquid crystal panel that includes the thin film transistor substrate to complete the fabrication of the liquid crystal display.

Figure 18:
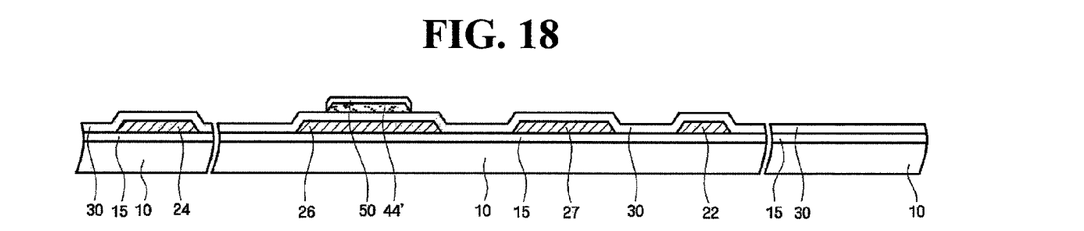
FIGS. 18 to 20 show vertical cross sections of a thin film transistor substrate in a liquid crystal display according to a third embodiment of the present invention at different stages of fabrication.
Figure 19:
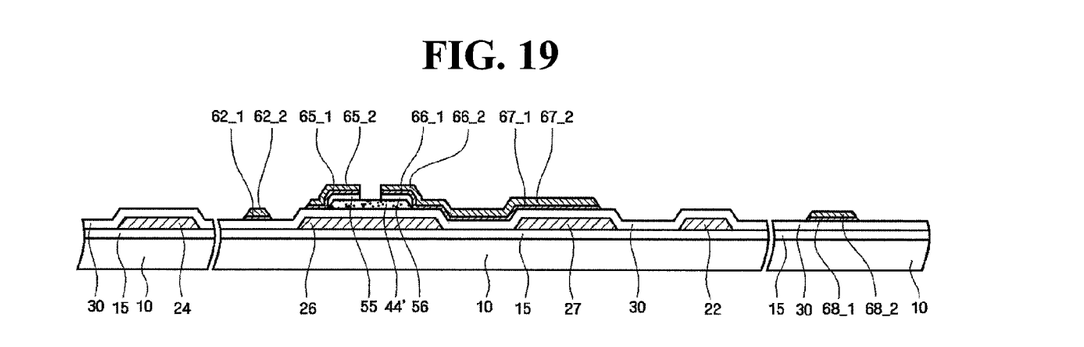
Figure 20:
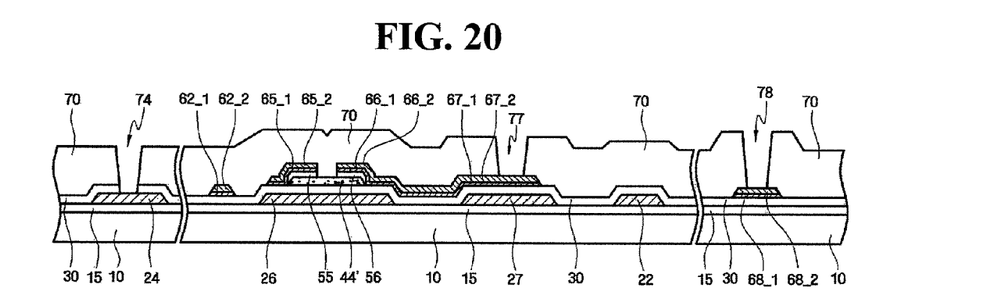

Now fabrication of the liquid crystal display according to the third embodiment of the present invention will be described in detail with reference to FIGS. 2, 3, 17A, 17B, and 18 to 20. FIGS. 18 to 20 illustrate vertical cross sections of the thin film transistor substrate according to the third embodiment at different stages of fabrication.

First, as shown in FIGS. 2 and 3, the adhesion layer 15 is formed on the insulating substrate 10, and the first wiring features 22, 24, 26, 27, and 28 are formed on the resulting structure.

Subsequently (FIGS. 17A, 18), the gate insulating layer 30 (silicon nitride), the intrinsic amorphous silicon layer, and the doped amorphous silicon layer are sequentially deposited over the first wiring features 22, 24, 26, 27, and 28 and the adhesion layer 15, by chemical vapor deposition for example, to a respective thickness of 150 to 500 nm, 50 to 200 nm, and 30 to 60 nm. The intrinsic amorphous silicon layer and the doped amorphous silicon layer are photolithographically patterned to form active layer features 44' (shaped as islands) and features 50 on the gate insulating layer 30 above the gate electrodes 26. (Features 50 will be patterned to provide the ohmic contact liners 55 and 56 (FIG. 19) as described below.) Like in the first and second embodiments, low temperature chemical vapor deposition is used in the third embodiment to prevent copper diffusion from the first wiring features 22, 24, 26, 27, and 28.

Subsequently, as shown in FIG. 19, the second wiring features 62 (a stack of features 62_1, 62_2), 65 (a stack of features 65_1, 65_2), 66 (a stack of features 66_1, 66_2), 67 (a stack of features 67_1, 67_2), 68 (a stack of features 68_1, 68_2) are formed (possibly using sputtering) on the gate insulating layer 30, the exposed portions of the active layer features 44', and the ohmic contact liners 55 and 56. The upper features 62_2, 65_2, 66_2, 67_2, and 68_2 are made of a very low resistivity layer, for example, copper, and the lower features 62_1, 65_1, 66_1, 67_1, and 68_1 are made of a layer capable of preventing the upper features 62_2, 65_2, 66_2, 67_2, and 68_2 from reacting with the active layer features 44'. This layer can be titanium or a titanium alloy. The second wiring features 62, 65, 66, 67, 68 include the data lines 62 that overlap the gate lines 22. The second wiring features 65 are source electrodes that are connected to the data lines 62 and extend to overlie the gate electrodes 26. The second wiring features 68 are data signal pads located at the ends of the data lines 62. The second wiring features 66 are drain electrodes that are separated from the respective source electrodes 65. The drain electrodes 66 and the source electrodes 65 lie at opposite ends of the respective channel regions which in turn overlie the respective gate electrodes 26. The second wiring features 67 are drain electrode extensions that extend from the drain electrodes 66 to overlap the respective large-area storage electrodes 27. The same etching solutions can be used to pattern the second wiring features 62, 65, 66, 67, 68 as in the first and second embodiments.

Subsequently, those portions of the doped amorphous silicon features 50 that are not covered with the second wiring features 62, 65, 66, 67, 68 are etched to form the ohmic contact liners 55, 56 and expose the active layer features 44' between each pair of the ohmic contact liners. Then oxygen plasma treatment can be performed to stabilize the exposed surfaces of the active layer features 44'.

Subsequently, as shown in FIG 20, the passivation layer 70 is formed as one or more layers including a photosensitive organic or inorganic layer providing red, green and blue color filters and having a low dielectric constant and a very smooth, planar top surface, e.g. a-Si:C:O or a-Si:O:F. Such a layer can be formed by plasma enhanced chemical vapor deposition (PECVD). Alternatively, an inorganic layer such as silicon nitride ($SixNy$) can be used.

Subsequently, the passivation layer 70 is photolithographically patterned, and is used as a mask to pattern the gate insulating layer 30, to form the contact holes 74, 77, and 78 exposing the gate signal pads 24, the drain electrode extensions 67, and the data signal pads 68. Of note, if the passivation layer 70 includes a photosensitive layer at the top, then the contact holes may be formed without photoresist. Further, the etch rates of the gate insulating layer 30 and the passivation layer 70 should preferably be substantially the same.

Finally, as shown in FIGS. 17A and 17B, the ITO or IZO layer is deposited and photolithographically patterned to form the pixel electrodes 82 connected through the respective contact holes 77 to the respective drain electrodes 66 and also to form the gate liners 84 and 88 connected through the respective contact holes 74 and 78 to the respective gate signal pads 24 and data signal pads 68. The thin film transistor substrate is now complete.

This thin film transistor substrate can be included into a liquid crystal display using the same fabrication techniques as for the other thin film transistor substrate embodiments described above.

Figure 21:
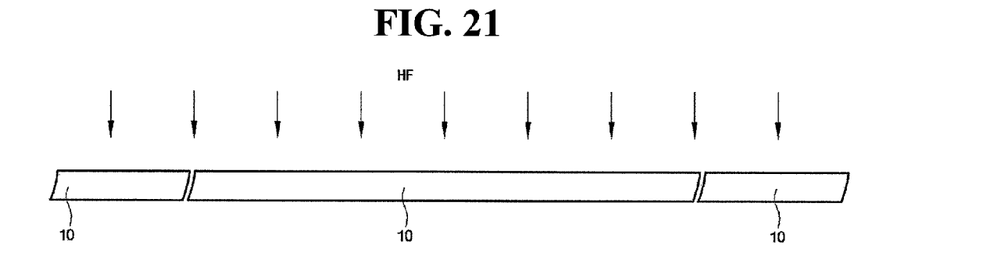
FIGS. 21 and 22 show vertical cross sections of a thin film transistor substrate in a liquid crystal display according to a fourth embodiment of the present invention at different stages of fabrication.
Figure 22:
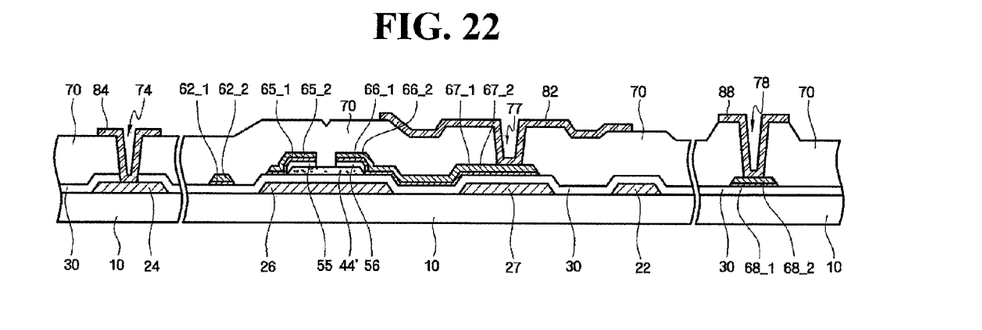

Now fabrication of a thin film transistor substrate according to the fourth embodiment of the present invention will be described with reference to FIGS. 21 and 22. FIGS. 21 and 22 illustrate vertical cross sections of the thin film transistor substrate at different stages of fabrication.

Referring to FIG. 21, the insulating substrate 10 can be made for example of soda lime glass as in the first to third embodiments. The insulating substrate 10 is subjected to surface treatment in order to improve the adhesion between the first wiring features (shown at 22, 24, 26, 27, and 28 in FIG. 16) and the insulating substrate 10. The surface treatment is performed using a substance capable of etching the insulating substrate 10. The substance can be hydrogen fluoride (HF) gas for example.

Fabrication then proceeds substantially as in FIGS. 18 to 20 to manufacture the thin film transistor substrate shown in FIG. 22.

Next, the common electrode substrate is disposed over the thin film transistor substrate, and liquid crystal is injected between the two substrates to form the liquid crystal panel. The back light assembly is disposed under the liquid crystal panel to complete the fabrication of the liquid crystal display.

Some embodiments of the present invention have the following advantages. An adhesion layer formed under the first wiring features improves adhesion between the first wiring features and the insulating substrate. Also, the adhesion layer has a high light transmittance.

Further, if the first wiring features and the second wiring features are made of copper, then the first and second wiring features have low resistance, they can be etched using the same etching solution, and their skew can be reduced.

Also, if the gate insulating layer, the active areas, and the ohmic contact liners are formed over the first wiring features using low temperature chemical vapor deposition, then copper diffusion from the first wiring features can be prevented.

The present disclosure of invention is not limited to the embodiments and advantages described above, and it will be apparent to those skilled in the art in view of the foregoing that various modifications and changes may be made thereto without departing from the spirit and scope of the present teachings. Therefore, it should be understood that the above embodiments are not limiting but are illustrative in all aspects.

What is claimed is:

1. A liquid crystal display comprising:
an insulating substrate made of a first material;
a first wiring feature formed on the insulating substrate and comprising copper;
an adhesion layer made of a second material different from the first material, where the adhesion layer is disposed directly on the insulating substrate so as to be interposed between the insulating substrate and the first wiring feature and where the second material provides greater adhesion to each of the insulating substrate and first wiring feature than an adhesion that would be present as between the first wiring feature and the insulating substrate alone, the adhesion layer having a thickness in a range of 190 to 210 nm, and
a copper diffusion impeding layer made of a third material different from the second material, where the copper diffusion impeding layer is disposed directly on top of the adhesion layer and the copper diffusion impeding layer covers the first wiring feature that comprises copper;
wherein transmittance of light through the adhesion layer is 98 to 100% when the light is of a predefined wavelength in a visible spectrum and when the light is incident on an interface between the insulating substrate and the adhesion layer at a predefined angle relative to a normal of the interface.

2. The liquid crystal display of claim 1, wherein the adhesion layer comprises an inorganic layer.

3. The liquid crystal display of claim 1, wherein the adhesion layer comprises a silicon nitride ($Si_xN_y$).

4. The liquid crystal display of claim 3 wherein the predefined angle is approximately zero degrees.

5. The liquid crystal display of claim 3 wherein the predefined wavelength is 600 nm.

6. The liquid crystal display of claim 1 wherein the copper diffusion impeding layer defines a gate insulating layer, said display further comprising:
an active area formed on the gate insulating layer; and
second wiring features overlapping at least a portion of the active area, the second wiring features comprising an upper layer formed of copper and a lower layer formed of a material that impedes a reaction between the upper layer and the active area.

7. The liquid crystal display of claim 6, wherein the lower layer comprises titanium.

8. A method of fabricating a liquid crystal display, the method comprising:
forming an adhesion layer having upper and lower surfaces and a thickness of 190 to 210 nm directly on an insulating substrate;
forming a first wiring feature comprising copper directly on top of the adhesion layer, and
forming a copper diffusion impeding layer directly contacting portions of the upper surface of the adhesion layer and overlaying the first wiring feature;
where the adhesion layer is made of a first light passing material,
where the copper diffusion impeding layer is made of a second light passing material different from the first light passing material, and
where the insulating substrate is made of a third light-passing material being different than first light passing material;
wherein an upper optical interface (n3/n2) is defined at locations where the copper diffusion impeding layer directly contacts the adhesion layer; and
wherein transmittance of light through the adhesion layer is 98 to 100% when the light is of a predefined wavelength in a visible spectrum and when the light is incident on the lower surface of the adhesion layer at a predefined angle relative to a normal of the lower surface of the adhesion layer.

9. The method of claim 8, wherein the adhesion layer comprises an inorganic layer.

10. The method of claim 9, wherein the adhesion layer comprises a silicon nitride or a silicon oxide exhibiting an adhesion to the first wiring feature that is greater than an adhesion that would be present between the first wiring feature and the third light-passing material disposed along the lower surface of the adhesion layer .

11. The method of claim 8 wherein the copper diffusion impeding layer defines a gate insulating layer, said method further comprising:

forming over the gate insulating layer, an active area, and second wiring features overlapping at least a portion of the active area, wherein the second wiring features comprise an upper layer formed of copper and a lower layer formed of a material that impedes a reaction between the upper layer and the active area.

12. The method of claim 11, wherein the lower layer comprises titanium.

13. The method of claim 11, wherein the gate insulating layer and the active area are formed by low temperature chemical vapor deposition.

14. The method of claim 13, wherein the low temperature chemical vapor deposition is performed at a temperature of 100 to 250° C.

15. The method of claim 11, wherein the forming of the second wiring features comprises patterning the upper layer by wet etching and patterning the lower layer by dry etching.

16. A method of fabricating a liquid crystal display, the method comprising:

performing surface treatment on an insulating substance using hydrogen fluoride gas; and forming a first wiring feature comprising copper directly on top of the insulating substrate whose surface has been treated with the hydrogen fluoride gas, wherein the surface treatment causes a greater adhesion between the insulating substrate and the first wiring feature than would have been present without the treatment;

forming over the first wiring feature a gate insulating layer composed of a copper diffusion impeding material, an active area, and second wiring features overlapping at least a portion of the active area, wherein the second wiring features comprise an upper layer formed of copper and a lower layer formed of a material that impedes a reaction between the upper layer and the active area.

17. The method of claim 16, wherein the lower layer comprises titanium.

18. The method of claim 16, wherein the gate insulating layer and the active area are formed by low temperature chemical vapor deposition.

19. The method of claim 18, wherein the low temperature chemical vapor deposition is performed at a temperature of 100 to 250° C.

20. The method of claim 16, wherein the forming of the second wiring features comprises patterning the upper layer by wet etching and patterning the lower layer by dry etching.

21. The liquid crystal display of claim 1 wherein the adhesion layer comprises a silicon oxide ($SiO_x$).

22. The liquid crystal display of claim 1 wherein the copper diffusion impeding layer comprises a silicon nitride.

* * * * *